G. A. LOWRY.
APPARATUS FOR SEPARATING AND COMBING GRASS, STRAW, AND THE LIKE.
APPLICATION FILED NOV. 17, 1902.

959,240.

Patented May 24, 1910.

5 SHEETS—SHEET 1.

Witnesses:
E. C. Semple.
C. H. Seem.

Inventor:
George A. Lowry
By Brown & Darby
Attys

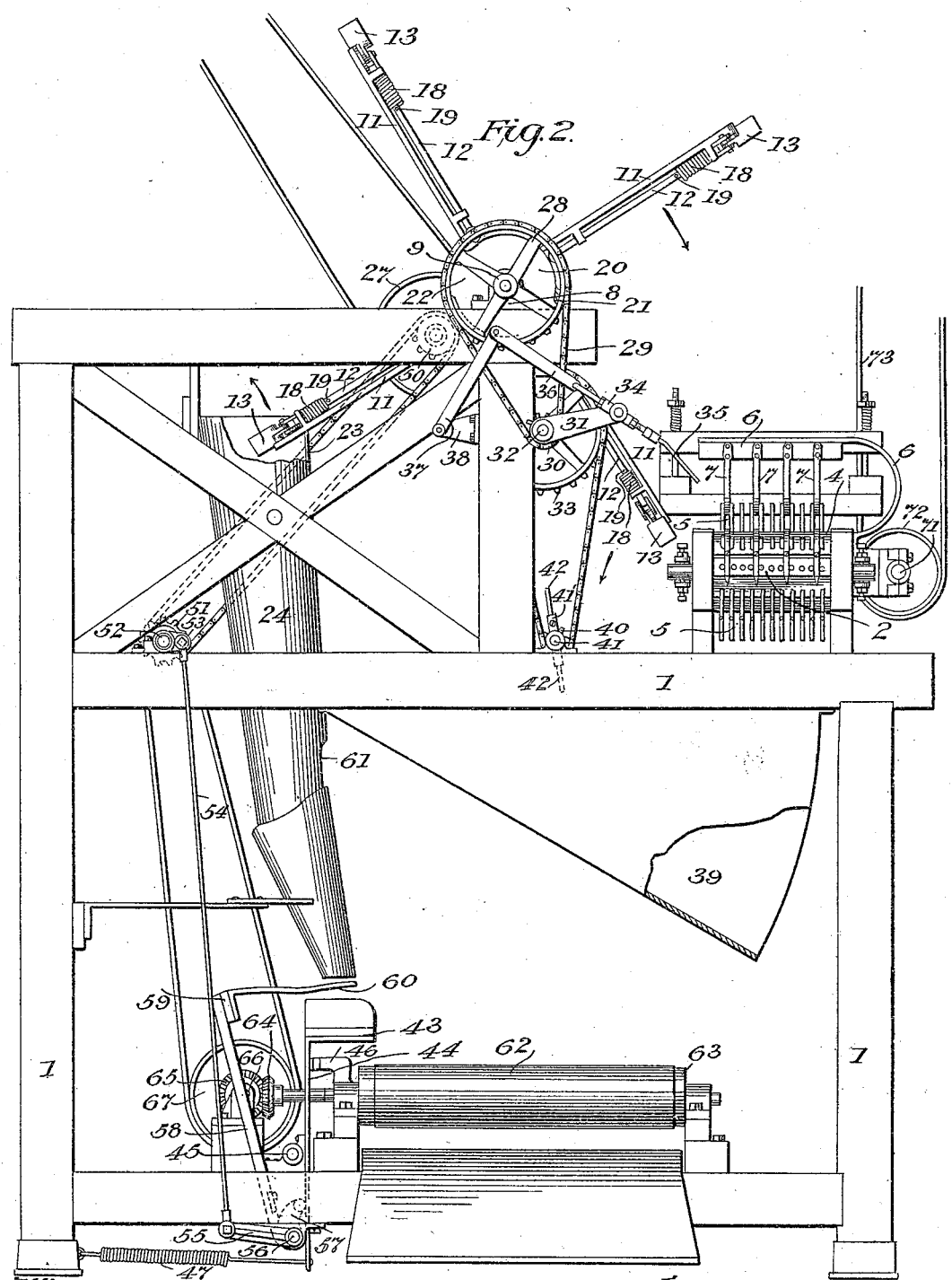

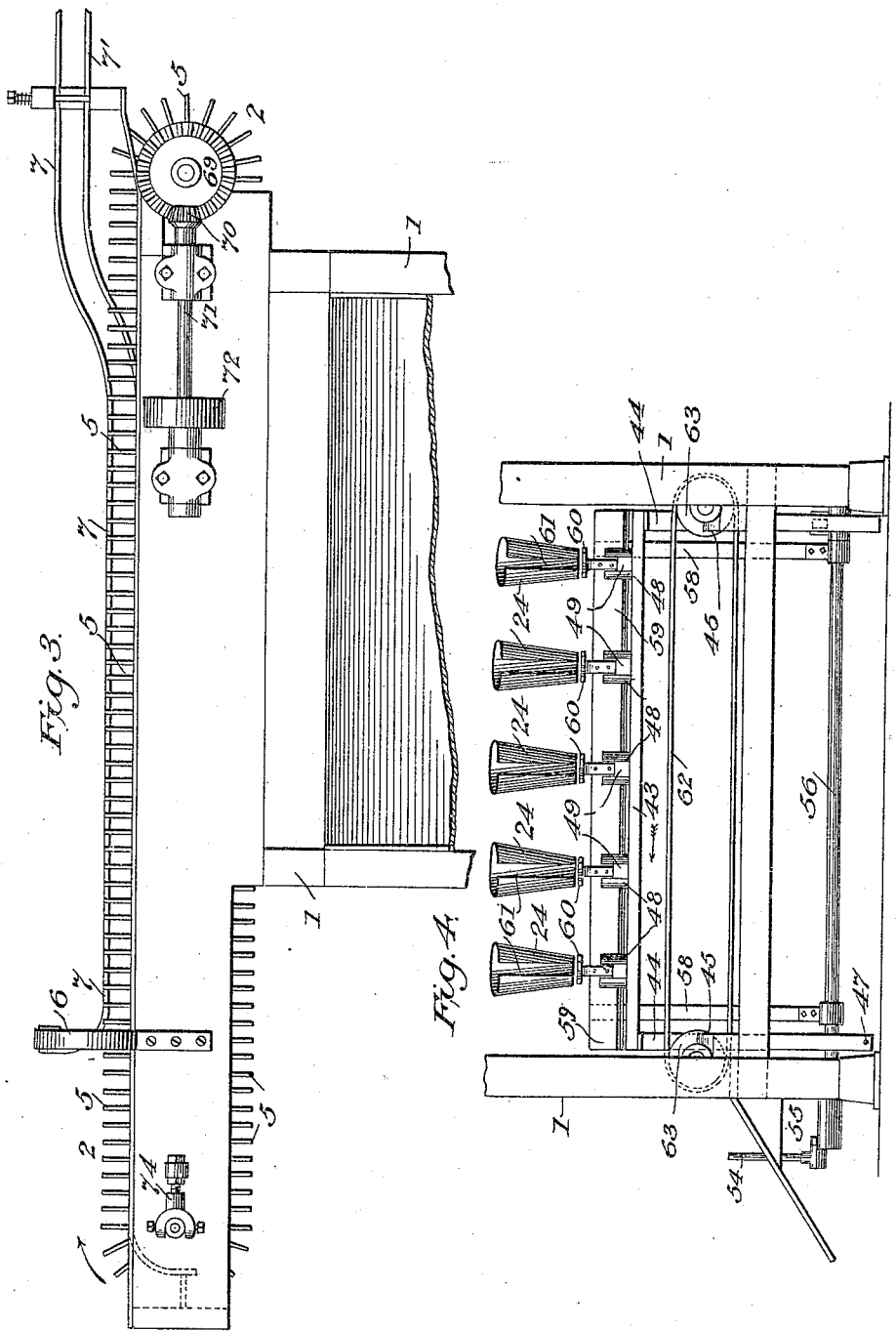

G. A. LOWRY.
APPARATUS FOR SEPARATING AND COMBING GRASS, STRAW, AND THE LIKE.
APPLICATION FILED NOV. 17, 1902.
959,240.
Patented May 24, 1910.
5 SHEETS—SHEET 4.
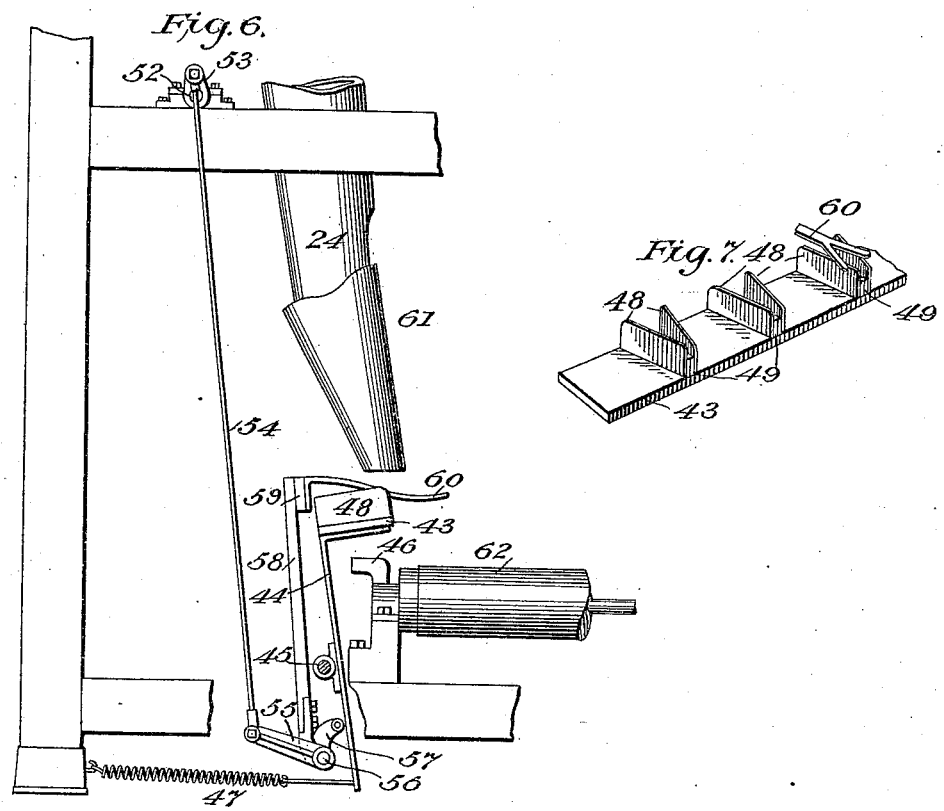
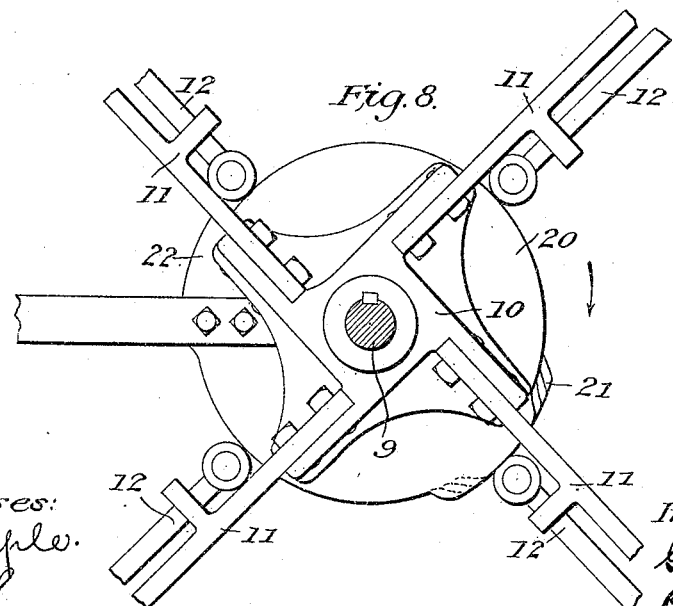

G. A. LOWRY.
APPARATUS FOR SEPARATING AND COMBING GRASS, STRAW, AND THE LIKE.
APPLICATION FILED NOV. 17, 1902.

959,240.

Patented May 24, 1910.

5 SHEETS—SHEET 5.

Witnesses:
E. C. Semple.
C. H. Seem.

Inventor:
George A. Lowry
By Brown & Darby
Attys

UNITED STATES PATENT OFFICE.

GEORGE A. LOWRY, OF CHICAGO, ILLINOIS, ASSIGNOR OF ONE-HALF TO JAMES F. O'SHAUGHNESSY, OF NEW YORK, N. Y.

APPARATUS FOR SEPARATING AND COMBING GRASS, STRAW, AND THE LIKE.

959,240.     Specification of Letters Patent.     Patented May 24, 1910.

Continuation of application Serial No. 21,306, filed June 23, 1900. This application filed November 17, 1902.
Serial No. 131,734.

*To all whom it may concern:*

Be it known that I, GEORGE A. LOWRY, a citizen of the United States, residing at Chicago, in the county of Cook and State of Illinois, have invented a new and useful Apparatus for Separating and Combing Grass, Straw, and the Like, of which the following is a specification.

This invention relates to apparatus for separating and combing grass, straw and the like.

The object of the invention is to provide a simple and efficient machine for separating and combing the stems or stalks of grass, straw and similar material.

The invention consists substantially in the construction, combination, location and arrangement of parts, all as will be more fully hereinafter set forth, as shown in the accompanying drawings, and finally pointed out in the appended claims.

Figure 1:
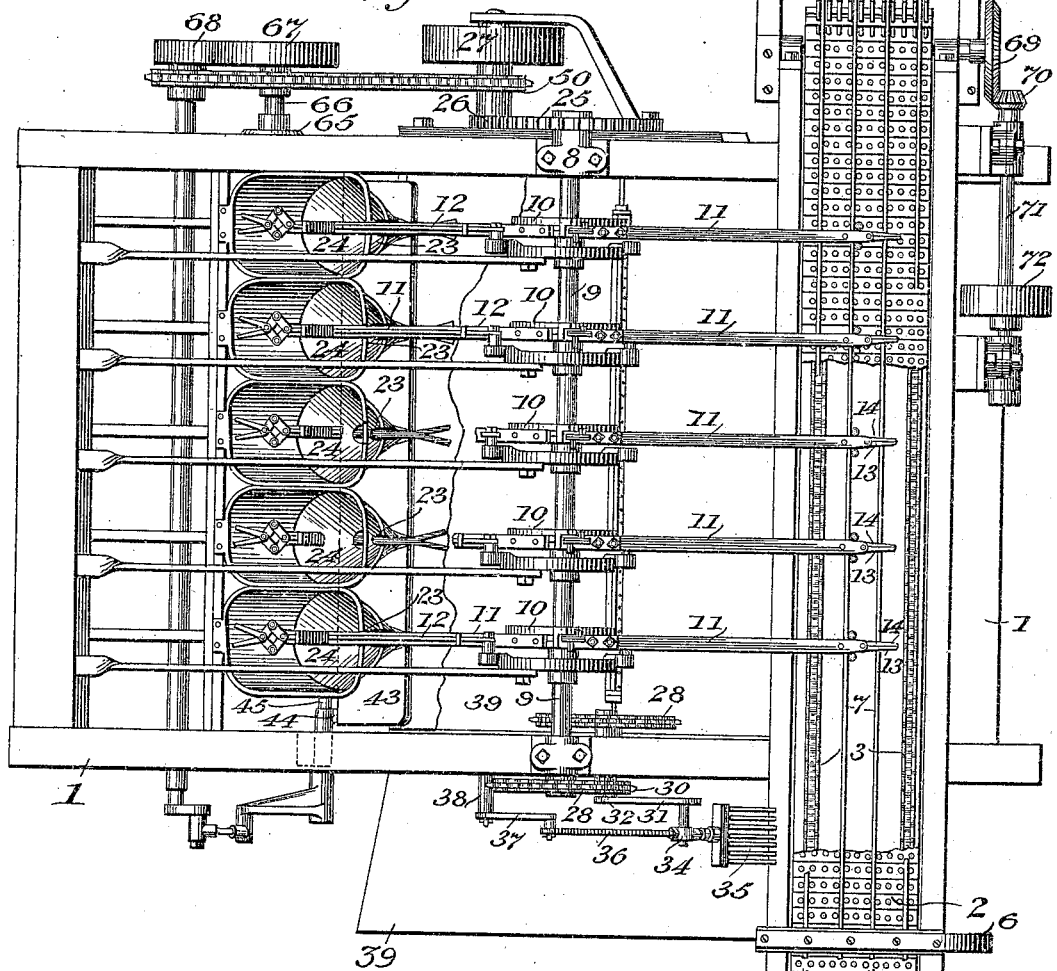
Figure 5:
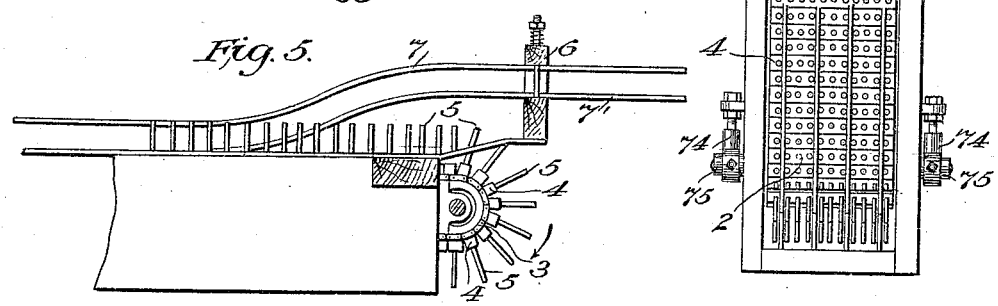
Figure 12:
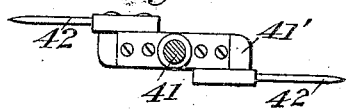
Figure 9:
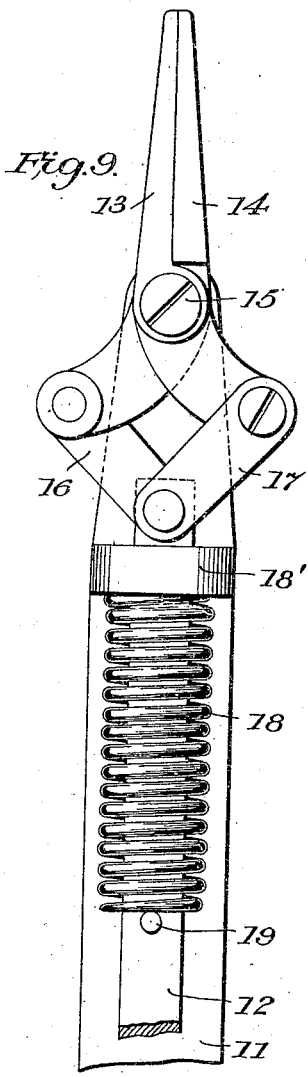
Figure 10:
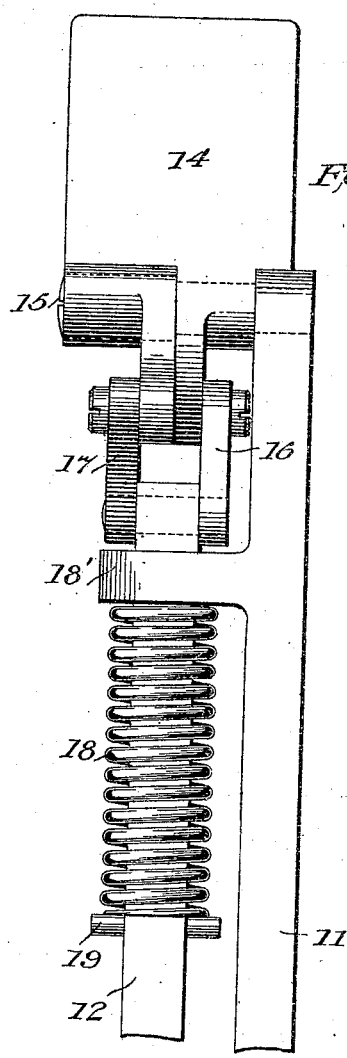
Figure 11:
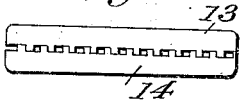

Referring to the accompanying drawings, and to the various views and reference signs appearing thereon,—Figure 1 is a plan view of a machine embodying the principles of my invention, a portion of the inclined chute and of the conveyer being broken away. Fig. 2 is a side elevation. Fig. 3, is an elevation of the feeding mechanism taken from the front of the machine. Fig. 4 is a broken view in front elevation of the discharge devices. Fig. 5 is a broken detail view in elevation, parts in vertical section, of devices for discharging the short ends of the stems, stalks or the like. Fig. 6 is a broken detail view in side elevation of the discharging devices for the long ends of the stems or stalks. Fig. 7 is a detached broken detail view in perspective of the plate employed in discharging the long ends of the stems or stalks. Fig. 8 is a view in side elevation of the gripping jaws and means for operating the same, the supporting shaft therefor being in transverse section. Figs. 9, 10 and 11, are respectively edge, side and end views of the gripping jaws, pickers or nippers. Fig. 12 is a detail view of the combing device, the supporting shaft therefor being in transverse section.

The same part is designated by the same reference sign wherever it occurs throughout the several views.

In preparing hay, grass, straw and the like, for use in the industrial arts in the manufacture of merchantable articles, it is frequently desirable to separate the longer stems or stalks from the shorter ones in order that they may be used most advantageously for the different purposes contemplated. It is also desirable that the grass, straw or similar material, may be combed so that the loose, useless stuff may be removed from that portion which is fit for use for manufacturing purposes.

It is the special purpose of the present invention to provide a machine of simple construction, and which is efficient in operation, whereby these results are secured.

In carrying out my invention, I provide a suitable framework 1, upon which the various operating parts of the machine are mounted. Suitably mounted upon the framework, and operating transversely thereof at its front end, is a conveyer 2. This may be of any convenient or suitable construction. In the particular construction shown, which I have found efficient, but to which the invention is not limited, this conveyer consists of a sprocket chain 3, to which are secured the transverse strips 4, each provided with a set of outwardly projecting pins 5. Upon suitable supports 6, are secured guide strips 7, arranged to lie in planes between the rows of pins 5, and at a distance from the conveyer substantially equal to the lengths of said pins, said guides serving to prevent the displacement of the material from between the pins as the conveyer is actuated. A second series of guides 7′, is arranged to extend the entire length of, and beyond, the delivery end of the conveyer 2, and in close proximity to such conveyer, except at the discharge end thereof, where said guides 7, 7′, are curved upwardly away from the ends of pins 5. The purpose of this construction and arrangement, and the operation thereof, is, that the material to be fed, as will be more fully explained hereinafter, is carried along by the conveyer or by the pins 5, thereon, through the space between the strips 7, 7′, and during such passage is combed, and the longer stems or straws are withdrawn therefrom, and all stems or stalks remaining in the carrier may be removed from the conveyer by being crowded or pushed into the deflected end of the guide formed by the strips 7, 7', at the discharge end of the conveyer, and thus be discharged from the machine at that point into any convenient receptacle arranged to receive them.

In suitable bearings 8, formed upon a convenient portion of the framework, is mounted a shaft 9, having mounted thereon, to revolve therewith, the hubs 10. Each hub carries projecting arms 11, having bearings adapted to receive longitudinally movable rods 12, as clearly shown in Figs. 8, 9, and 10. Mounted upon and in concentric relation with respect to shaft 9, and in coöperative relation with each hub 10, is a cam disk 20, having the cam projections 21, 22, thereon, and upon the periphery of which cam disks the inner ends of rods 12, bear, as most clearly shown in Fig. 8 each cam disk 20 being stationarily held against rotative movement on or with shaft 9 by being secured to an arm or bar of the machine frame, as clearly shown in Figs. 1 and 8. Pivotally mounted, as at 15, upon the outer ends of arms 11, are the coöperating clamping jaws 13, 14, each jaw being suitably connected by the links 16, 17, to the outer end of rod 12. A spring 18, is interposed between the bearing 18', upon arm 11, through which the rod 12, operates, and a pin 19, upon said rod 12. The tension of this spring is constantly exerted in a direction to cause the nippers, pickers or clamping jaws 13, 14, to be closed upon each other, and said jaws are opened against the action of spring 18, by means of the cam projections 21, 22, operating upon the ends of rods 12 which latter are provided with anti-friction rollers offset with relation to each other. As shown in Fig. 8, the cam projection 21, is a step-cam, the steps of which are arranged to cause the successive rods 12, to be actuated at different points while passing through the material upon the conveyer, that is, each step of the cam operates upon a different rod 12, whereby said jaws are operated at different periods of time, thus enabling the jaws actuated by said rods to select stems or stalks of only a certain length. In this manner one set of jaws, pickers or nippers will grasp stems of a certain length, a second set will grasp stems or stalks slightly longer, and the next set will grasp stems or stalks of yet greater length, and so on. With this improved arrangement and by operating the successive jaws, pickers or nippers at different points, the material will not only be separated in different lots, but the stalks of each lot will be deposited together on the conveyer 62, after which the conveyer will carry the separate lots beyond the hoppers so that the next lot of stalks of a different length may be deposited together on the conveyer. When the material reaches the point of discharge from the conveyer, the different lots or the lots of uniform length may be readily gathered and assembled by the operator into separated piles.

In the operation of the machine an attendant grasps from any source of supply a bunch or bundle of the material and holding the same loosely in his hands shakes the butt-ends of said stems or stalks against a convenient platform so as to even the butt-ends of all the stems or stalks in the bunch or bundle, the opposite ends of said stems or stalks occupying various positions relative to each other by reason of the variations in the lengths of the stems or stalks. The bunch is then placed upon the conveyer 2, with the butt-ends thereof presented outwardly or away from the machine, so that the material may be grasped by the conveyer pins and carried thereby transversely of the machine, and in transverse position relative to, and between, the guide strips 7, 7'. By rotating shaft 9, the clamping jaws, prickers or nippers are caused to enter the material while the latter is being carried along by the conveyer, and when said jaws, pickers or nippers are passing through the material they are caused to open and close so as to grasp certain of the stems or stalks, the steps of cam projection 21, serving to regulate the points at which the jaws will open, thereby regulating the length of the straws or stems grasped thereby. The hubs 10, revolve in the direction indicated by the arrows in Figs. 2 and 8, each pair of jaws removing or withdrawing from the conveyer the stems or stalks grasped by said jaws. The continued revolution of shaft 9, causes the clamping jaws to carry the straws gripped thereby into position to be dropped into the chutes or hoppers 24, said chutes or hoppers being slotted as at 23, (see Fig. 2) to permit said straws to be carried laterally into said hoppers. At this point the jaws are again opened by the action of the cam projections 22, on the cam disks, and the stems or stalks are dropped into said hoppers with the butt-ends thereof presented downwardly.

The shaft 9, may be operated in any suitable or convenient manner, as, for instance, by means of a drive-pulley 27, and intermeshing pinions 26, and 25, respectively mounted on the shaft of said pulley and said shaft 9. Upon the end of shaft 9, is mounted a sprocket wheel 28, connected by chain 29, to a second wheel 30, suitably mounted upon a stud or shaft 32, upon which is carried a crank arm 31. On the opposite end of said shaft 32, is mounted a sprocket wheel 33. Upon the outer end of arm 31, is mounted a block 34, upon which is adjustably mounted a combing device 35, to which is connected an arm 36, said arm 36, being connected by a link 37, to a stationary part 38, of the framework. The purpose of this combing device is to comb from the ends of the stems any loose useless stuff which may have become mixed therein, and allow such loose useless or waste material to drop upon the inclined chute 39, from which it may be removed. The sprocket wheel 33, is connected by a chain to a wheel 40, on a shaft 41, extending transversely of the machine. Secured upon to revolve with shaft 41, are the strips 41', having a series of teeth 42, projecting therefrom. These teeth are arranged to revolve in the path traversed by the stems or stalks which have been gripped by the clamping jaws, above described, and during the travel of such jaws into position to deposit such stems or stalks in the hoppers 24, thereby thoroughly combing therefrom any loose useless stuff which may remain therein after the action of the comb 35. It is obvious that the combing device 35, will only act upon that portion of the stems or stalks which projects beyond the conveyer 2, while the revolving comb will act upon the remaining portion. When the stems or stalks of material are released within the hoppers 24, they drop until arrested in their downward movement by the shelf or plate 43. This shelf or plate is carried by arms 44, pivotally mounted as at 45, and held against the stop 46, by the action of a spring 47. Upon shelf or plate 43, and immediately beneath each hopper 24, are mounted vertical plates 48, arranged in inclined relation, and connected at their front ends by another plate 49, of less height thereby forming converging compartments. The object and purpose of this construction will be explained more fully hereinafter. To the hub of pulley 27, is secured a sprocket wheel 50, suitably geared to gear 51, on shaft 52. The opposite end of this shaft has secured thereon an arm 53, suitably connected by rod 54, to a rocker arm 55, secured to a rocker shaft 56, the latter having secured thereon arms 57, 58. The arms 57, are arranged, when said shaft 56, is rocked, to engage the lower ends of arms 44, and tilt or rock the same about their pivots 45, and against the action of spring 47, in one direction, while at the same time the arms 58, secured to the same shaft 56, and which carry at their upper ends a plate 59, will be rocked or swung in the opposite direction. The plate 59, carried by arms 58, has mounted thereon a series of forked arms or pushing devices 60, which straddle the stems projecting from the bottom of the hopper 24, and force or push them against the wall or plate 49, which at the same time is moved in the opposite direction, this combined movement serving to tip the stems over through the slot 61, in the lower ends of the hoppers, thus depositing such stems or straws crosswise upon a traveling apron 62, mounted to operate over rollers 63, and which may be actuated by a bevel-gear 64, meshing with gear 65, upon a stud 66, the latter being revolved through pulley 67, connected by a belt or otherwise to pulley 68, on the shaft 52. The carrier 62, delivers the stems or stalks, which have thus been selected and separated, to any suitable point where they may be bundled or preserved for use.

The conveyer 2, may be operated in any suitable manner, as by means of gears 69, and 70, and shaft 71, the latter being rotated through belt 73, operating over pulley 72, thereon. Any slack in the conveyer may be taken up by laterally adjusting the roller over which the conveyer operates, at one end thereof, as, for instance, by adjusting the box-holding device 74, in which the boxes 75, of such roller are mounted.

From the foregoing description it will be seen that the material is separated by the machine into three different lots: first, the loose useless stuff which is combed from the material by means of the combing devices, and which is deposited upon the inclined chute 39; second, the short ends or stems which are not removed by the gripping devices from the carrier or conveyer 2, and which are discharged by such conveyer between the inclined ends of the guides 7, 7', and which shorter stems or stalks may be used for various purposes in the manufacturing industries; and third, the long stems or stalks which are removed by the gripping devices and delivered upon carrier 62, as above described, and which, being thus selected, may be used for other purposes for which it is best adapted, and from which all the shorter ends and waste material have been carefully removed.

The operation of the machine will be fully understood from the foregoing description.

It is obvious that many variations and changes in the details of construction and arrangement would readily suggest themselves to persons skilled in the art and still fall within the spirit and scope of my invention. I do not desire, therefore, to be limited or restricted to the exact details of construction and arrangement shown and described.

This application is filed in lieu of and contains the same subject-matter as application Serial No. 21,306, filed June 23, 1900.

Having now set forth the object and nature of my invention, and a construction embodying the principles thereof, what I claim as new and useful and of my own invention, and desire to secure by Letters Patent, is:

1. In a machine for separating grass, etc., the combination with the conveyer for the mixed material, of a rotatable shaft provided with a series of arms secured thereto, each arm having pivoted jaws and a spring for closing the same, of cams for opening or closing the several jaws at different intervals with respect to each other and points of rotation, and releasing cams for operating the jaws to release the grass, stems or stalks.

2. In a machine for separating grass, etc., the combination with the conveyer for the mixed material, of mechanism for selecting and separating stems or stalks of different lengths from such material and from each other, and delivery hoppers into which the selected stems or stalks are delivered.

3. In a machine for separating grass, etc., the combination with a series of rotatable jaws and mechanism for causing such jaws to select stems or stalks of grass of different lengths, and a series of delivery hoppers, and devices for causing the jaws to deliver the selected stems or stalks into these hoppers; substantially as and for the purpose set forth.

4. In a machine for separating grass, etc., the combination with the selecting mechanism, of hoppers into which the selected stems or stalks are delivered, and a shelf arranged under the bottoms of such hoppers for arresting the downward movement of the stems or stalks, and means for toppling over the stems or stalks from the shelf; substantially as and for the purpose set forth.

5. In a machine for separating grass, etc., the combination with mechanism for selecting the stems or stalks and delivering the same, of hoppers adapted to receive such stems or stalks, and provided with vertical slits at their ends, of a vibrating shelf arranged to support the butts of such stems or stalks, a receptacle, and means for toppling over such stems or stalks onto said receptacle; substantially as and for the purpose set forth.

6. In a machine for separating grass, etc., the combination with mechanism for selecting the stems or stalks and delivering the same, of hoppers for receiving such stems or stalks, provided with vertical slits at their lower ends, a rocking shelf under the lower ends of such hoppers, a receptacle, and means acting in conjunction with such rocking shelf to tip over the stems or stalks into said receptacle; substantially as and for the purpose set forth.

7. In a machine for separating grass, etc., the combination with mechanism for selecting the stems or stalks and delivering the same, of hoppers for receiving such selected stems or stalks, provided with vertical slits at their lower ends, a pivoted shelf and means for rocking such shelf, and pushing arms, and means for rocking the pushing arms in the opposite direction from the shelf; substantially as and for the purpose set forth.

8. In a machine for separating grass, etc., the combination with the mechanism for selecting the stems or stalks and delivering the same, of hoppers for receiving the stems or stalks, provided with vertical slits at their lower ends, a shelf arranged underneath the hoppers to support the butts of the stems or stalks, push arms to tip over the stems or stalks, and an apron to receive the stems or stalks after they have been tipped over and convey them away to a suitable point; substantially as and for the purpose set forth.

9. In a machine for separating grass, etc., the combination with mechanism for selecting the stems or stalks and delivering the same, of hoppers provided with vertical slits at their lower inner ends, a shelf having arranged thereon converging compartments with the walls thereof lowered at the apex, and each compartment arranged under the bottom of a hopper, and pushing devices intermediate of the bottom of the hoppers and the shelf for pushing the stems or stalks toward the apex of the converging compartments on such shelf and toppling them over the lowered portion of the wall at the apex thereof; substantially as and for the purpose set forth.

10. In a machine for separating grass, etc., the combination with a conveyer for the mixed material, of devices for selecting the stems or stalks from such material and removing them from such conveyer, and a combing device arranged in the path of the selecting devices, and serving to remove any loose material clinging to the stems or stalks; substantially as and for the purpose set forth.

11. In a machine for separating grass, etc., the combination with a conveyer provided with sets of rows of pins upon its surface, and guides over the same, a combing device for the mixed material upon the conveyer, mechanism for selecting stems or stalks from the mixed material, and a second combing device arranged in the path of the selecting mechanism and adapted to comb loose material from the stems or stalks; substantially as and for the purpose set forth.

12. In a machine for separating grass, etc., the combination with a conveyer for the mixed material, of mechanism for selecting stems or stalks of different lengths therefrom and delivering the same, of a series of hoppers for receiving the stems or stalks, and provided with vertical slits near their lower ends, a shelf arranged under the bottom of such hoppers, a pushing device arranged to contact with the stems or stalks between their butts and upper ends and topple them over, and an apron for receiving and carrying away such selected stems or stalks; substantially as and for the purpose set forth.

13. In a machine for separating grass, etc., a conveyer adapted to feed the grass, selector mechanism for grasping the stems or stalks of grass according to the length thereof, and a hopper, and means for actuating said selector mechanism to withdraw the grass from said conveyer and deposit the same into said hopper for the purpose set forth.

14. In a machine for separating grass and the like, the combination with a conveyer for the material, of pickers operating to enter the material being conveyed, and means for operating said pickers successively at different points in their path of rotation with respect to and separate from each other.

15. In a machine for separating grass and the like, the combination with a conveyer for the material, of clamping jaws arranged to enter the material on the conveyer and grasp a portion of such material to withdraw the same from such conveyer, and means whereby said pickers are operated in different positions thereof with respect to each other to grasp the material.

16. In a machine for separating grass and the like, the combination with a conveyer for the mixed grass, of pickers operating adjacent to said conveyer, each picker having clamping jaws adapted to grasp a portion of the grass carried by said conveyer, and means for opening and closing the jaws of said pickers at different points in their path of rotation and with respect to each other.

17. In a machine for separating grass and the like, the combination with a conveyer for the mixed material, of pickers, each having clamping jaws, means for operating said pickers to project into the mass of material carried by said conveyer, means for opening and closing the jaws of said pickers at different points with respect to each other for causing each of said pickers to select its appropriate stem or stalk according to the length thereof, and to cause the pickers to release the stems or stalks and deliver the same at the proper points.

18. In a machine for separating grass and the like, the combination with a conveyer for the mixed material, of a rotatable shaft and a series of pickers secured to said shaft, each picker provided with clamping jaws, a spring for closing said jaws, opening mechanism for the pickers, and a cam surface arranged to engage the opening mechanism of the different pickers at different points in their path of rotation and with respect to each other.

19. In a machine for the purpose described, the combination of means for conveying the hay, grass, straw or the like, and a plurality of pickers acting transversely to the line of travel of the conveying means and having different points of operation with respect to each other, said pickers being arranged in a series longitudinally of such line of travel.

20. In a machine for the purpose described, the combination of means for conveying the hay, grass, straw, or the like in a direction transversely to the axes of the same and a plurality of pickers acting transversely of the line of travel of the conveying means and arranged in a series longitudinally of such line of travel, said pickers having different points of operation with respect to each other.

21. In a machine of the class described, the combination of means for conveying the hay, grass, straw, or the like, a plurality of pickers mounted to rotate upon a common axis and acting transversely to the line of travel of the conveying means and arranged in a series longitudinally of such line of travel, said pickers operating at different points with respect to each other.

22. In a machine for separating grass etc., the combination of a conveyer for the mixed material, a rotatable shaft, a plurality of arms secured thereon, a picker secured to each one of the arms, said pickers acting transversely to the line of travel of the conveyer and operating at different points with respect to each other to grasp the material, said pickers being arranged in a series longitudinal of such line of travel, and means for releasing the material.

23. In a machine for separating grass etc., the combination of a conveyer for the mixed material, a rotatable shaft, a plurality of arms secured thereto, a picker carried by each of the arms, said pickers acting transversely of the line of travel of the conveyer and arranged in a series longitudinally of such line of travel, and means for operating the pickers at different points of rotation and with respect to each other.

In witness whereof, I have hereunto set my hand, this nineteenth day of September, 1902, in the presence of the subscribing witnesses.

GEORGE A. LOWRY.

Witnesses:
WM. M. RHEEM,
NATHANIEL LEE JOHNSON.